United States Patent
Zhang

(10) Patent No.: US 9,342,779 B2
(45) Date of Patent: May 17, 2016

(54) SMART CARD SIMULTANEOUSLY HAVING TWO READ/WRITE MODE MATRIXES AND METHOD FOR PRODUCING SAME

(75) Inventor: Xiaodong Zhang, Beijing (CN)

(73) Assignee: GOLDEN SPRING INTERNET OF THINGS INC., Beijing (CN)

( * ) Notice: Subject to any disclaimer, the term of this patent is extended or adjusted under 35 U.S.C. 154(b) by 0 days.

(21) Appl. No.: 14/355,398

(22) PCT Filed: Jan. 6, 2012

(86) PCT No.: PCT/CN2012/070084
§ 371 (c)(1),
(2), (4) Date: Nov. 10, 2014

(87) PCT Pub. No.: WO2013/063870
PCT Pub. Date: May 10, 2013

(65) Prior Publication Data
US 2015/0090799 A1    Apr. 2, 2015

(30) Foreign Application Priority Data
Nov. 3, 2011   (CN) .......................... 2011 1 0344303

(51) Int. Cl.
*G06K 19/06* (2006.01)
*G06K 19/077* (2006.01)
*G06K 19/07* (2006.01)

(52) U.S. Cl.
CPC ...... *G06K 19/07754* (2013.01); *G06K 19/0723* (2013.01); *Y10T 29/49018* (2015.01)

(58) Field of Classification Search
CPC ............... G06K 19/07749; G06K 19/07745; G06K 19/0775; G06K 19/041; G06K 19/0723; G06K 19/07718; G06K 19/07769
USPC ............................................ 235/492
See application file for complete search history.

(56) References Cited

U.S. PATENT DOCUMENTS

| | | | | |
|---|---|---|---|---|
| 6,012,641 A * | 1/2000 | Watada | ........................... | 235/488 |
| 6,036,099 A * | 3/2000 | Leighton | ........................ | 235/488 |
| 6,161,761 A * | 12/2000 | Ghaem et al. | ................ | 235/492 |
| 2006/0038022 A1* | 2/2006 | Reid et al. | .................... | 235/492 |
| 2008/0308641 A1* | 12/2008 | Finn | ............................ | 235/492 |
| 2009/0250154 A1* | 10/2009 | Nagano et al. | ............... | 156/73.5 |
| 2010/0200661 A1* | 8/2010 | Shafran et al. | ............... | 235/492 |

FOREIGN PATENT DOCUMENTS

| | | |
|---|---|---|
| CN | 1750026 | 3/2006 |
| CN | 101350073 | 1/2009 |
| CN | 101527008 | 9/2009 |

* cited by examiner

*Primary Examiner* — Thien M Le
*Assistant Examiner* — Claude J Brown

(57) ABSTRACT

A smart card with two read-write modes includes antenna layer, and an antenna and a chip module circuits on the antenna layer, wherein the antenna and the chip module circuit are electrically connected via an elastic conductive device. The invention also provides a manufacturing method of the aforesaid smart card with two read-write modes, which includes steps of: embedding an antenna on a back side or a front side of an antenna layer; after completing embedding on the antenna layer, add bedding sheets, printed sheets and protection films respectively above and underneath the antenna layer, then laminating to obtain a card base carrier; cutting card from the treated whole-sheet card base carrier to obtain a card base, and milling slots on the obtained card base, then finally encapsulating.

2 Claims, 4 Drawing Sheets

SMART CARD SIMULTANEOUSLY HAVING TWO READ/WRITE MODE MATRIXES AND METHOD FOR PRODUCING SAME

CROSS REFERENCE OF RELATED APPLICATION

This is a U.S. National Stage under 35 U.S.C 371 of the International Application PCT/CN2012/070084, filed Jan. 6, 2012, which claims priority under 35 U.S.C. 119(a-d) to CN 201110344303.1, filed Nov. 3, 2011.

BACKGROUND OF THE PRESENT INVENTION

1. Field of Invention

This invention belongs to the field of manufacturing of smart card, and relates particularly to smart card with two read-write modes as well as to its manufacturing method.

2. Description of Related Arts

DI (Dual Interface) card is the abbreviation of smart card with two read-write modes. Constructed with PVC (Polyvinyl Chloride) layer, chip module and coil, the DI card is a single chip module based card with integrated contact and contactless interfaces. With two operation interfaces, the DI card allows access to the chip module either via contact points of the contact mode or via radio frequency mode in a certain distance (within 10 cm), to execute the same operation; the two interfaces follow two different standards: the contact interface meets ISO/IEC 7816, while the contactless interface meets ISO/IEC 14443. The two interfaces share a same micro processor, operating system and EEPROM (Electrically Erasable Programmable Read-Only Memory).

Besides one chip module, inside the DI card, there is also an antenna coil connecting with the chip module, when using the contactless interface, the electro-magnetic field generated by the reader will provide energy, through radio frequency to supply energy and transmit data.

At present, there are two kinds of DI card manufacturing process, one of which includes the below steps:

Make ready the antenna and base materials, and make pre-lamination to get the inlay layer; align and register the top layer which contains top printed sheet and protection film, the bottom layer which contains bottom printed sheet and protection film, precisely with the Inlay layer, then laminate and cut card, to obtain the card base of smart card with two read-write modes; mill slot for the first time at the location of chip module of the card base, and manually pick and draw the wires, trim wire end, and etc., of the antenna on the card base obtained after the first time slotting, then mill slot for the second time; concurrently, on another equipment, solder and mill flat to the two contact points of the chip module; and finally, in the encapsulation machine, place in order the treated card base and the chip module to encapsulate them, place in order the treated card base and chip module on the dual-interface encapsulation machine to encapsulate them.

The other kind has the following steps:

Make ready the antenna and base materials, and make pre-lamination to get the inlay layer; align and register the top layer which contains top printed sheet and protection film, the bottom layer which contains bottom printed sheet and protection film, precisely with the Inlay layer, then laminate and cut card, to obtain the card base of smart card; mill slot for the first time at the location of chip module of the card base, and mill slot for the second time at the locations of the chip module's circuit contact points; infill with conductive adhesive on the location of second time slotting, and set the chip module into the corresponding contact points to solidify.

Finally place in sequence the treated card base and chip module on the dual-interface encapsulation machine.

In the course of materializing the above said DI card production, it is found by the inventor that there are at least the following problems with the existing techniques: many steps have to resort to manual work, e.g., soldering, and etc., characterized by low daily output, and also by difficulty in controlling the operation method, where, even skilled workers are hard to guarantee product quality; manual work also causing high rejection rate, and applying the method on the treatment of soldering and copper wire may damage the antenna wire end and the chip module, resulting in reduced stability of the finished card. If conductive adhesive is adopted, the exposure in the air of the adhesive in the course of solidification process, as well as the fairly long solidification time yields the adhesive's conductivity significantly susceptible to time and environmental factors, which would result in unstable conductivity of card.

SUMMARY OF THE PRESENT INVENTION

An object technical problem the present invention deals with is to provide a high-output, good quality, high-yield, and high-stability smart card with two read-write modes, as well as a manufacturing method thereof.

In order to solve the above technical problems, the present invention adopts the technical proposal as follows:

A smart card with two read-write modes, comprising an antenna layer, and antenna and chip module circuit on the antenna layer, wherein: the antenna and the chip module circuits are electrically connected via an elastic conductive device.

In the smart card with the two read-write modes of the present invention, a wire end of the antenna and elastic conductive device are electrically connected with each other, the elastic conductive device is set in the corresponding area of circuit contact points of the chip module circuit, and one side of the elastic conductive device is electrically connected with the circuit contact points of the chip module circuit.

In the smart card with the two read-write modes of the present invention, the elastic conductive device in which is a metallic elastic conductive device.

In the smart card with the two read-write modes of the present invention, the elastic conductive device is a nonmetallic elastic conductive device.

In the smart card with the two read-write modes of the present invention, the wire end of the antenna is set by single-wire or multi-wire reciprocating windings on the antenna layer in the area corresponding to circuit contact points of the chip module circuit.

In the smart card with the two read-write modes of the present invention, the wire end of the antenna and the other side of elastic conductive device are electrically connected with each other by welding.

In the smart card with the two read-write modes of the present invention, the wire end of the antenna and the other side of elastic conductive device are directly contacted to electrically connect.

In the smart card with two read-write modes of the present invention, a thickness of the antenna layer is 0.13~0.16 mm.

The present invention also affords a manufacturing method of the aforesaid smart card with the two read-write modes, which includes the following steps of:

(1) embedding: embedding an antenna on a back side or a front side of an antenna layer, and setting a wire end of the antenna in an area corresponding to circuit contact points of a chip module circuit;

(2) laminating: after completing embedding on the antenna layer, add bedding sheets, printed sheets and protection films respectively above and underneath the antenna layer, then laminating to obtain a card base carrier;

(3) cutting card and slotting: cutting the card from the treated whole-sheet card base carrier to obtain a card base; milling slot in the obtained card base: firstly milling a slot B5 on a location for insetting of a chip module, with a depth thereof equaling to a thickness of a chip module lead frame, then milling a slot B6 in a center of the slot B5; adopting a milling cutter with a special sensor for milling the location; while milling the slot using the milling cutter, real-time detecting whether to mill to an embedded cooper wire layer; when the wire end of the embedded wire is touched, immediately stopping by a preset program and memorizing a value; then milling slots B3 on locations for elastic devices, depths of the B3 slots are decided by the memorized value; and (4) encapsulating: at first insetting the elastic devices into the slots B3 and connecting with the wire ends of the antenna, then insetting the chip module circuit into the slot B5 and the slot B6 at the location of the elastic conductive device corresponding to the circuit contact points, then finalizing a shape.

In the manufacturing method of the smart card with the two read-write modes of the present invention, in the step (1) of which, the wire end of the antenna is made into a contact pad through reciprocating windings, which is located in the area corresponding to the circuit contact points of the chip module circuit.

The two read-write modes smart card and its manufacturing method of the present invention, electrically connect the antenna and the chip module circuit adopting the elastic conductive device, saving manual operations such as soldering, and etc., resulting in increased production efficiency; and mill slot using milling cutter with special sensor, resulting in the guaranteed product quality, high yield rate, as well as stable performance of the obtained smart card.

The bending and torsion tests outperform the international and national testing standards by 2~3 folds, the high-temperature high-humidity and impact resistance tests by 0.5~1 fold and all other tests meet the international and national standards.

The smart card with two read-write modes and its manufacturing method of the present invention is further expounded in combination with the attached figures.

DETAILED DESCRIPTION OF THE PREFERRED EMBODIMENT

Figure 1:
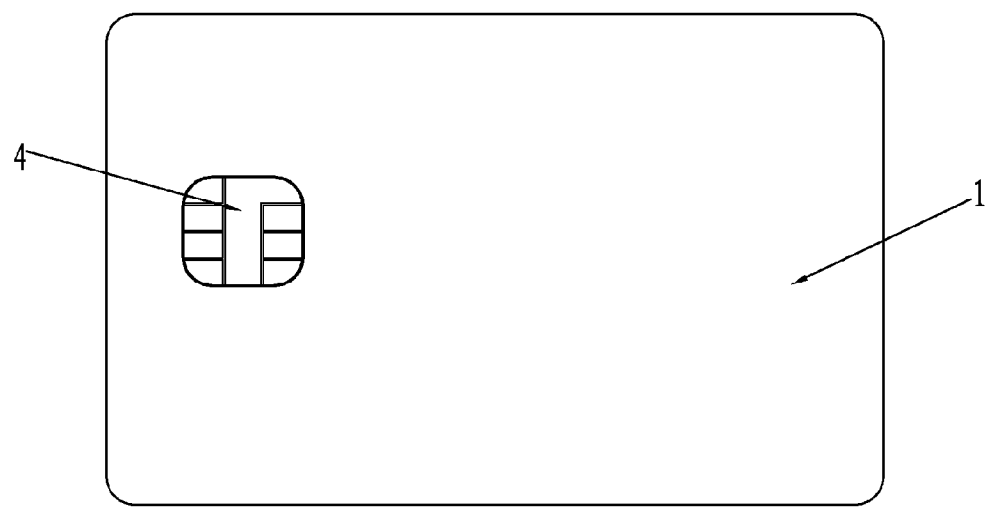
FIG. 1 is a schematic diagram of the two read-write modes smart card of the present invention
Figure 2:
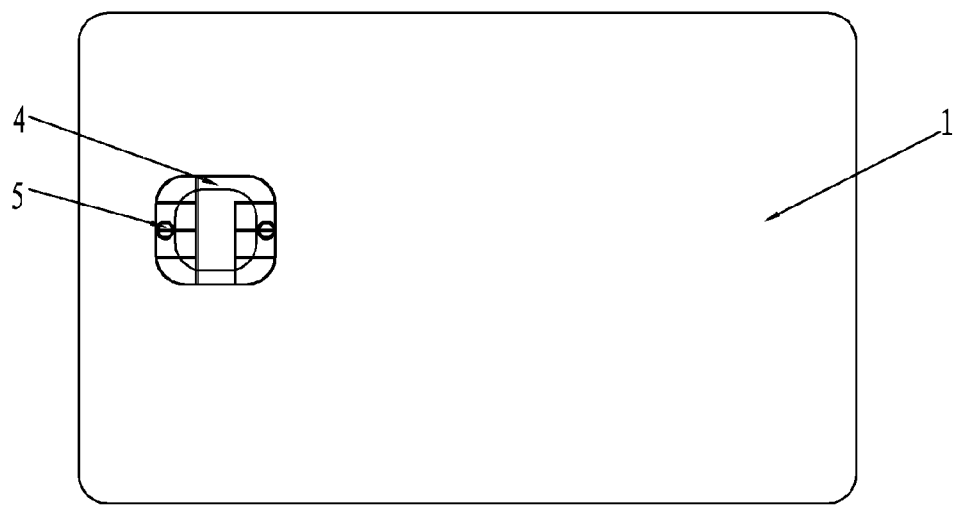
FIG. 2 is a perspective view of the two read-write modes smart card of the present invention
Figure 3:
FIG. 3 is a section view of the two read-write modes smart card of the present invention
Figure 4:
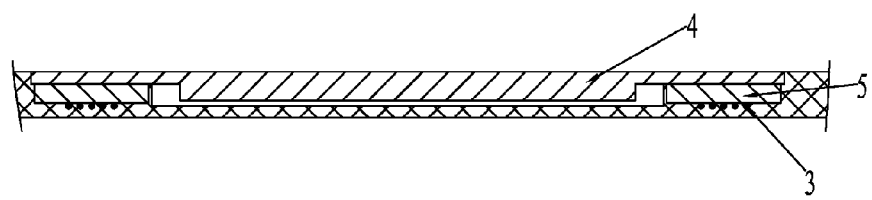
FIG. 4 is a partial enlarged view of FIG. 3

As shown in FIGS. 1-4 and FIG. 7, a smart card with two read-write modes of the present invention comprehends a base layer 1, an antenna layer 2, an antenna 3 set above the antenna layer 2 and a chip module circuit (4); a thickness of antenna layer 2 is 0.13~0.16 mm, and the antenna layer 2 is set inside the base layer 1; a wire end 31 of the antenna 3 is by way of single-wire or multi-wire reciprocating windings set on the antenna layer 2 in an area corresponding to circuit contact points of the chip module circuit 4; slots B5 and B6 are milled on the base layer 1, two slots B3 are respectively milled on a bottom side of slot B5; there are two elastic conductive device 5, respectively set inside the two slots B3; the elastic conductive device 5 are respectively set in the area corresponding to the two circuit contact points of the chip module circuit 4; the wire end 31 of the antenna 3 is electrically connected to one side of the elastic conductive device 5; the chip module circuit is set inside the slots B5 and B6; the other side of the elastic conductive device 5 is electrically connected with the circuit contact points of the chip module circuit 4. The elastic conductive device 5 is a metallic elastic conductive device, e.g., a metallic spring piece, or alternatively a non-metallic elastic conductive device, e.g., conductive graphite. The wire end 31 of the antenna 3 is electrically connected with the elastic conductive device by welding or direct contact.

The smart card with the two read-write modes and its manufacturing method of the present invention include the following steps of:

(1) Wire Embedding

Figure 7:
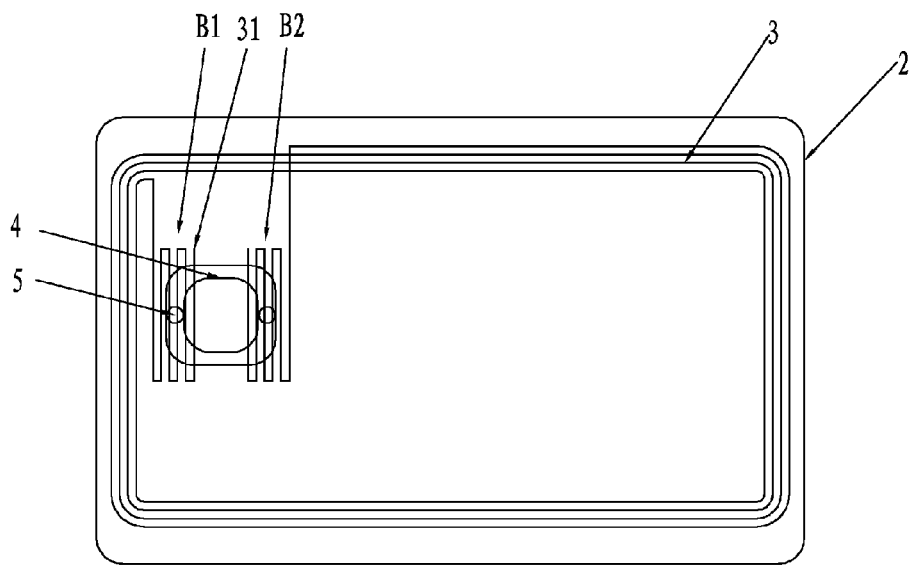
FIG. 7 is a schematic diagram of the position relationship of the chip module, elastic conductive device and antenna
Figure 8:
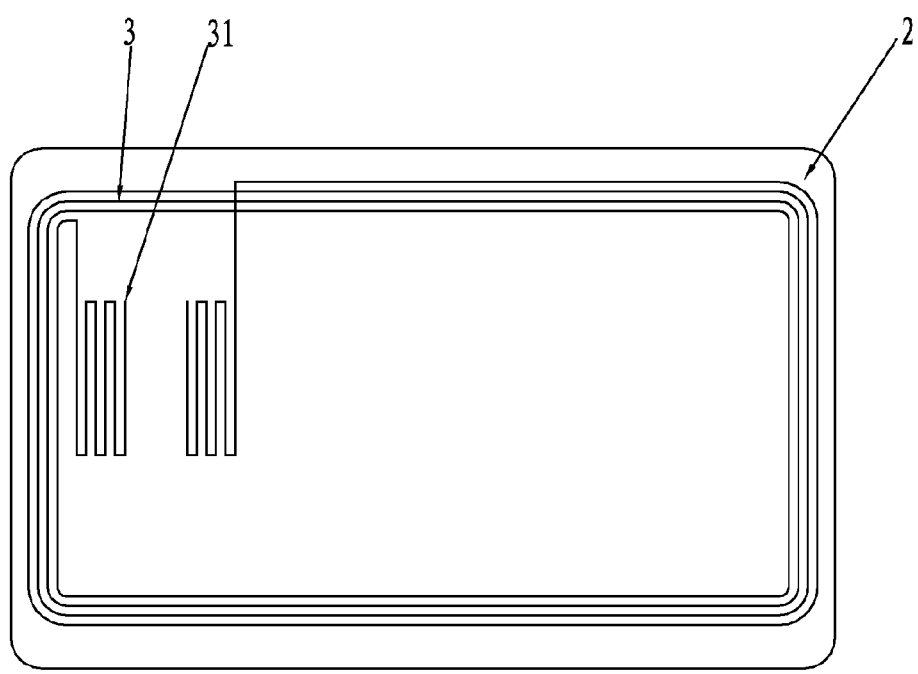
FIG. 8 is a schematic diagram of the antenna layer after wire-embedding

As shown in FIG. 8, embedding an antenna 3 on a back or a front side of an antenna layer 2, and making a wire end of the antenna 3 by reciprocating winding into a contact pad, or making a contact piece by other method, for instance, welding a wire on a metal piece, then placing the contact pad or the contact piece on the antenna layer 2 at a location corresponding to a chip module circuit 4, namely two circuit contact points of a chip module, e.g., B1 and B2 (FIG. 7), which serves purpose of causing the antenna 3 and the chip module to be reliably contacted through an elastic conductive device. The FIG. 8 displays a pattern of reciprocating wire end winding.

(2) Laminating

After finishing wire embedding on the antenna layer 2, adding bedding sheets, printed sheets and protection films respectively above and underneath the antenna layer 2 before laminating to obtain a steadily bonded card base carrier. Thickness of the layers may vary upon different requirements. Taking this example, the thickness of the wire-embedding antenna layer 2 is approximately 0.15 mm, bedding sheets, printed sheets and protection films are added respectively above and underneath of the antenna layer to cause it to develop certain strength, contributing to a final thickness of the card base up to around 0.8 mm.

(3) Cutting Card and Slotting

Figure 5:
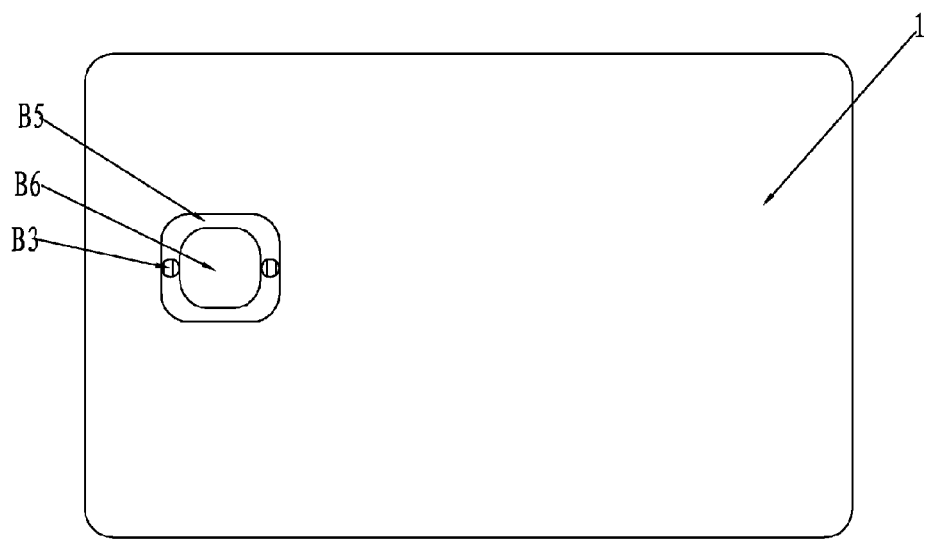
FIG. 5 is a schematic diagram of the card base finished of slotting process

Cutting card from the treated whole-sheet card base carrier to obtain a card base; milling slots on the obtained card base, as shown in FIG. 5, firstly milling a slot B5 on a location for insetting the chip module circuit 4, with its depth equaling to a thickness of a chip module lead frame, then milling a slot B6 in the middle of the slot B5; adopting a milling cutter with a special sensor for milling this location; while milling the slot using the milling cutter, real-time detecting whether milling to an embedded cooper wire layer; when the wire end of the embedded wire is touched, immediately stopping by a preset program and memorizing a value; then milling slots B3 on location of the elastic device 5, depths of the B3 slots are to be decided by the memorized value.

(4) Encapsulating

Figure 6:
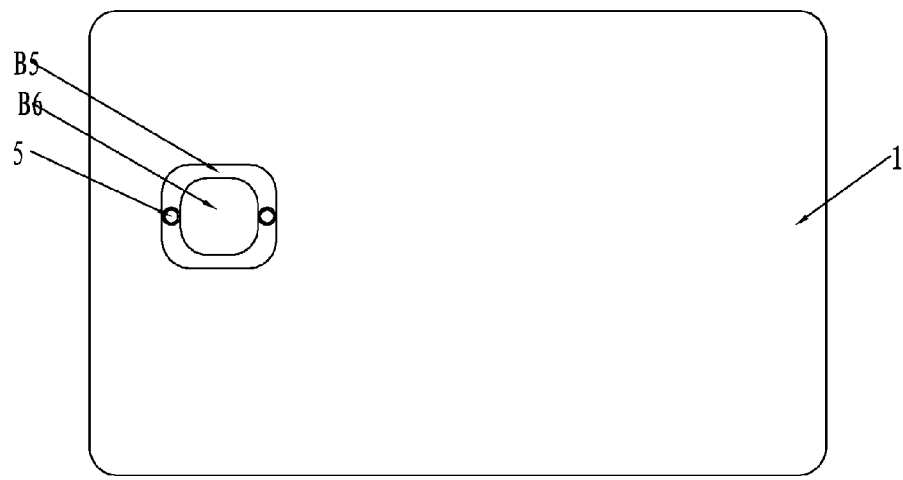
FIG. 6 is a schematic diagram of inset elastic conductive devices

As shown in FIG. 6 and FIG. 7, at first insetting the elastic device 5 into the slots B3, then insetting the chip module circuit 4 into the slots B5 and B6 by the location of the elastic conductive device 5 corresponding to the circuit contact points, at last proceeding thermal encapsulation, cold encapsulation forming, and smart card function testing.

The above said example serves to describe the optimal implementation way only, other than lay limits on the extent of the present invention. Apart from a departure from the design spirit of the present invention, any transformation and/or improvement made on the technical proposal of the present invention by common technical personnel in this field shall exclusively fall within the scope of protection defined by the present invention claims.

INDUSTRIAL UTILITIES

The smart card with two read-write modes of the present invention can find wide applications in finance and accounting, social insurance, transportation and travel, medical and public health, governmental administration, commodity retailing, leisure and recreation, school administration, and etc.

What is claimed is:

1. A manufacturing method of a smart card with two read-write modes, comprising steps of:
   (1) embedding: embedding an antenna on a back side or a front side of an antenna layer, and setting a wire end of the antenna in an area corresponding to circuit contact points of a chip module circuit;
   (2) laminating: after completing embedding on the antenna layer, add bedding sheets, printed sheets and protection films respectively above and underneath the antenna layer, then laminating to obtain a card base carrier;
   (3) cutting card and slotting: cutting the card from the treated whole-sheet card base carrier to obtain a card base; milling slot in the obtained card base: firstly milling a first slot (B5) on a location for insetting of a chip module, with a depth thereof equaling to a thickness of a chip module lead frame, then milling a second slot (B6) in a center of the first slot (B5); adopting a milling cutter with a special sensor for milling a location; while milling the second slot (B6) using the milling cutter, real-time detecting whether to mill to an embedded copper wire layer; when the wire end of the embedded wire is touched, immediately stopping by a preset program and memorizing a value; then milling third and fourth slots (B3) on locations for the elastic devices, depths of the third and fourth slots (B3) are decided by the memorized value; and
   (4) encapsulating: at first insetting the elastic devices into the third and fourth slots (B3) and connecting with the wire ends of the antenna, then insetting the chip module circuit into the first slot (B5) and the second slot (B6) at the location of the elastic conductive device corresponding to the circuit contact points.

2. The manufacturing method as described in claim 1, wherein: in the step (1), the wire end of the antenna is made into a contact pad through reciprocating windings, which is located in the area corresponding to the circuit contact points of the chip module circuit.

* * * * *